(12) United States Patent
Suzuki et al.

(10) Patent No.: US 10,513,966 B2
(45) Date of Patent: Dec. 24, 2019

(54) REFRIGERANT CONTROL VALVE DEVICE (71) Applicant: AISIN SEIKI KABUSHIKI KAISHA, Kariya-shi, Aichi-ken (JP)

(72) Inventors: Hideyuki Suzuki, Toyohashi (JP); Masanobu Matsusaka, Chita (JP); Yojiro Koga, Kariya (JP); Naoto Yumisashi, Nagoya (JP); Koichi Maruyama, Obu (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 99 days.

(21) Appl. No.: 15/416,658

(22) Filed: Jan. 26, 2017

(65) Prior Publication Data
US 2017/0211460 A1 Jul. 27, 2017

(30) Foreign Application Priority Data

Jan. 26, 2016 (JP) .................................. 2016-012030

(51) Int. Cl.
*F01P 7/14* (2006.01)
*F16K 11/087* (2006.01)
(Continued)

(52) U.S. Cl.
CPC ................ *F01P 7/14* (2013.01); *F16K 5/061* (2013.01); *F16K 5/0689* (2013.01); *F16K 5/208* (2013.01);
(Continued)

(58) Field of Classification Search
CPC ... F01P 2007/146; F01P 7/14; F16K 11/0876; F16K 5/061; F16K 5/0689; F16K 5/208; F25B 41/06
See application file for complete search history.

(56) References Cited

U.S. PATENT DOCUMENTS 2,751,185 A  6/1956 Shand
2,837,308 A  6/1958 Shand
(Continued)

FOREIGN PATENT DOCUMENTS

DE  102013222825 A1  5/2015
JP  S52-044439 U  3/1977
(Continued)

OTHER PUBLICATIONS

Extended European Search Report dated Jun. 21, 2017 issued by the European Patent Office in corresponding European Patent Application No. 17153001.7 (9 pages).
(Continued)

*Primary Examiner* — Grant Moubry
*Assistant Examiner* — Ruben Picon-Feliciano
(74) *Attorney, Agent, or Firm* — Buchanan Ingersoll & Rooney PC (57) ABSTRACT

A refrigerant control valve device includes: a spherical rotor having an opening and rotating about a rotation axis; a housing including at least one circumferential port, and an axial port, the housing allowing a refrigerant to flow therein and the rotor being accommodated in the housing; at least one hole formed in the rotor and allowing the internal space of the rotor and the circumferential port to communicate with each other when the rotor rotates; a ring-shaped seal member installed coaxially with the circumferential port; a biasing member applying a biasing force to the seal member; a packing body provided between the housing and an outer diameter portion of the seal member; and a fixing member holding the packing body with the housing in a direction in which the circumferential port extends.

13 Claims, 6 Drawing Sheets

(51) Int. Cl.
   *F16K 5/06*     (2006.01)
   *F16K 5/20*     (2006.01)
   *F25B 41/06*    (2006.01)

(52) U.S. Cl.
   CPC .......... *F16K 11/0876* (2013.01); *F25B 41/06* (2013.01); *F01P 2007/146* (2013.01)

(56) References Cited

U.S. PATENT DOCUMENTS

| | | |
|---|---|---|
| 8,820,706 B2 | 9/2014 | Kawauchi et al. |
| 9,115,634 B2 | 8/2015 | Triebe et al. |
| 2003/0178595 A1 | 9/2003 | Koester et al. |
| 2018/0135775 A1* | 5/2018 | Ito .......................... F16K 47/02 |

FOREIGN PATENT DOCUMENTS

| | | |
|---|---|---|
| JP | S63-094370 U | 6/1988 |
| JP | H10-038102 A | 2/1998 |
| JP | 2005-521006 A | 7/2005 |
| JP | 2013-29127 A | 2/2013 |
| JP | 5355723 B2 | 11/2013 |

OTHER PUBLICATIONS

Office Action (Notice of Reasons for Refusal) issued on Oct. 1, 2019, by the Japanese Patent Office in corresponding Japanese Patent Application No. 2016-012030 and an English Translation of the Office Action. (12 pages).

* cited by examiner

REFRIGERANT CONTROL VALVE DEVICE

CROSS REFERENCE TO RELATED APPLICATIONS

This application is based on and claims priority under 35 U.S.C. § 119 to Japanese Patent Application 2016-012030, filed on Jan. 26, 2016, the entire contents of which are incorporated herein by reference.

TECHNICAL FIELD

This disclosure relates to a refrigerant control valve device which controls a flow of a refrigerant by the rotation of a rotor.

BACKGROUND DISCUSSION

JP 2013-29127A (Reference 1) discloses a refrigerant control valve device (a valve device in Reference 1) in which a valve body is rotatably accommodated in a valve housing, and the refrigerant control valve device includes a ring-shaped seal body (a seal member in Reference 1), which is inserted from the outside into a cylindrical portion of a guide member that constitutes a refrigerant flow path, and a spring member which biases the seal body in a direction where the seal body comes into contact with the outer surface of the valve body. Here, the valve body has a spherical outer surface, and the seal body is formed in a ring shape so as to come into contact with the outer surface. A communication portion is formed on the outer circumferential surface of the seal body so as to apply the pressure of the refrigerant to a pressure receiving surface of the seal body facing a valve body, and a pressure receiving surface opposite to the pressure receiving surface. In addition, by making the respective pressure receiving surfaces have the same area and forming the communication portion, the pressure applied to the pressure receiving surface from the refrigerant in a direction opposite to the biasing force of the spring member and the pressure applied to the pressure receiving surface from the refrigerant in a direction along the biasing force of the spring member cancel out each other, thereby inhibiting a trouble that a pressure is excessively applied to the seal body.

In the refrigerant control valve device in Reference 1, a predetermined pressure is applied to the pair of pressure receiving surfaces from the refrigerant when the valve body is in an opened posture. However, because the refrigerant is not supplied into the space in which the valve body is accommodated when the valve body is in a closed posture, there is concern that the pressure applied to the pair of pressure receiving surfaces from the refrigerant may be temporarily unbalanced when the valve body is operated.

In a case in which the pressure applied to the pair of pressure receiving surfaces of the seal mechanism is unbalanced as described above, the contact pressure of the seal body to the valve body is also changed, and as a result, there is concern that a sealing property may be deteriorated.

Thus, a need exists for a refrigerant control valve device which is not susceptible to the drawback mentioned above.

SUMMARY

A feature of a refrigerant control valve device according to an aspect of this disclosure resides in that the refrigerant control valve device includes: a spherical rotor having an opening opened in a direction of a rotation axis, and configured to rotate about the rotation axis; a housing which includes at least one circumferential port configured to be formed around an axis passing through a spherical center of the rotor, and an axial port formed at a side of the opening in the direction of the rotation axis, in which the housing is configured to allow a refrigerant to flow therein and the rotor is accommodated in the housing; at least one hole formed in the rotor and configured to allow the internal space of the rotor and the circumferential port to communicate with each other when the rotor rotates; a ring-shaped seal member installed coaxially with the circumferential port, and accommodated in the housing to be abutted on an outer surface of the rotor; a biasing member configured to apply a biasing force to the seal member in a direction toward the spherical center of the rotor; a packing body provided between the housing and an outer diameter portion of the seal member, and formed to be slidably abutted on the outer diameter portion of the seal member; and a fixing member configured to hold the packing body with the housing in a direction in which the circumferential port extends. The seal member includes a first pressure receiving surface configured to receive a pressure applied from the refrigerant in a direction identical to a biasing direction of the biasing member, and a second pressure receiving surface having an area that is substantially equal to that of the first pressure receiving surface, and configured to receive a pressure applied by the refrigerant in a direction opposite to the biasing direction with respect to the seal member, at a side of the seal member which is filled with the refrigerant when the rotor is in a state in which the internal space of the rotor and the circumferential port do not communicate with each other.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments disclosed here will be described with reference to the drawings.

First Embodiment: Basic Configuration

Figure 1:
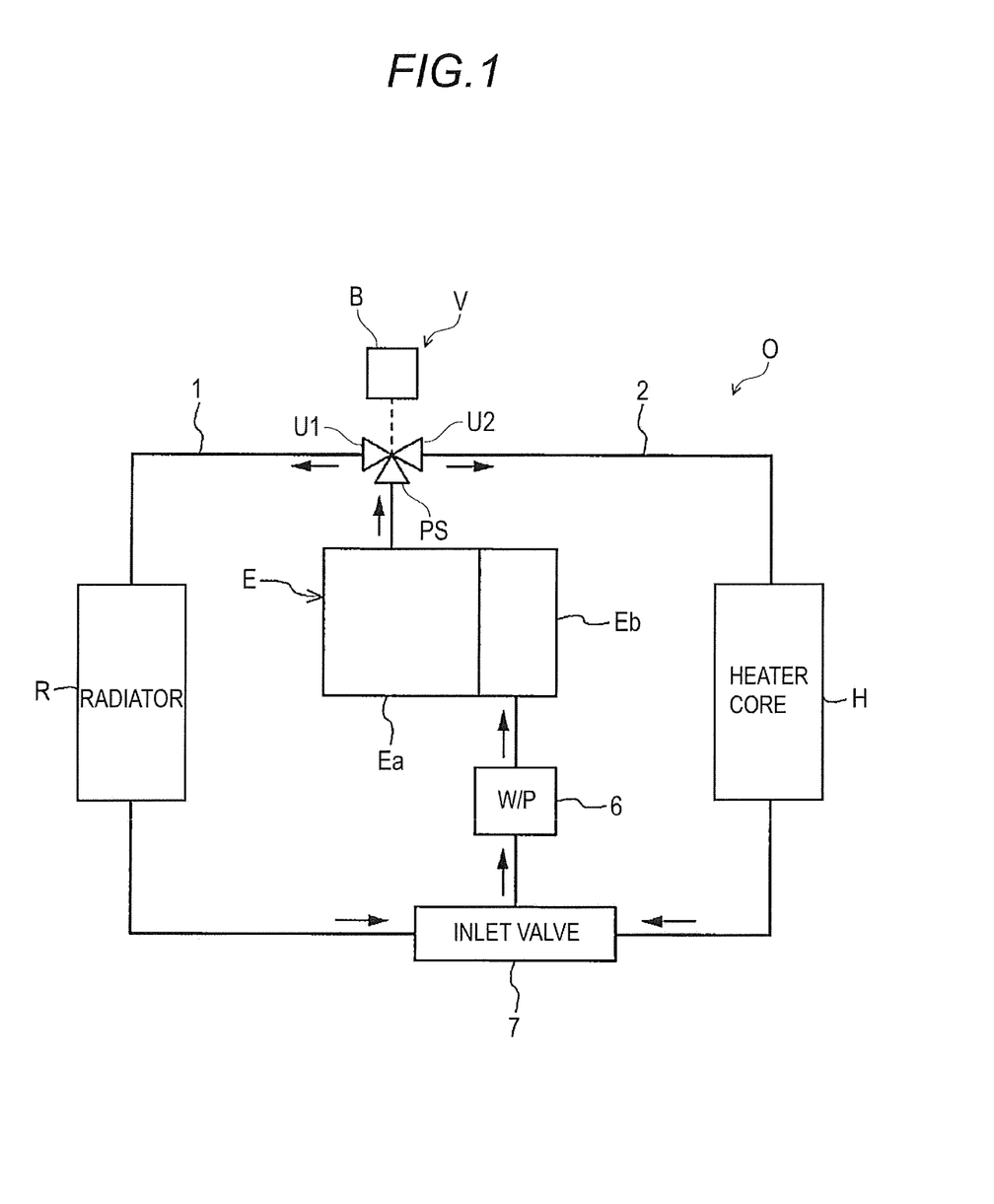
FIG. 1 is an explanatory view illustrating an engine cooling circuit according to a first embodiment.

As an example in which a refrigerant control valve device V is used, the refrigerant control valve device V is provided in an engine cooling circuit O illustrated in FIG. 1, and includes an axial port PS that receives a coolant (e.g., refrigerant) from an engine E as an internal combustion engine for a vehicle, a first circumferential port U1 that sends the coolant to a radiator R through a radiator hose 1, and a second circumferential port U2 that sends the coolant to a heater core H through a heater hose 2. The engine E includes a cylinder head part Ea and a cylinder block part Eb, and the coolant is supplied from the cylinder head part Ea to the axial port PS of the refrigerant control valve device V. In addition, the coolant supplied to the radiator R and the coolant supplied to the heater core H are sent to a water pump (W/P) 6 from an inlet valve 7, and return back to the cylinder block part Eb of the engine E from the water pump 6.

In the first embodiment, the coolant is supplied from the refrigerant control valve device V to the radiator R and the heater core H. However, the coolant may be supplied and used for heat exchange of, for example, engine oil or a fluid of an automatic transmission. In a case in which the coolant is used as described above, a third circumferential port may be formed for the refrigerant control valve device V.

Figure 2:
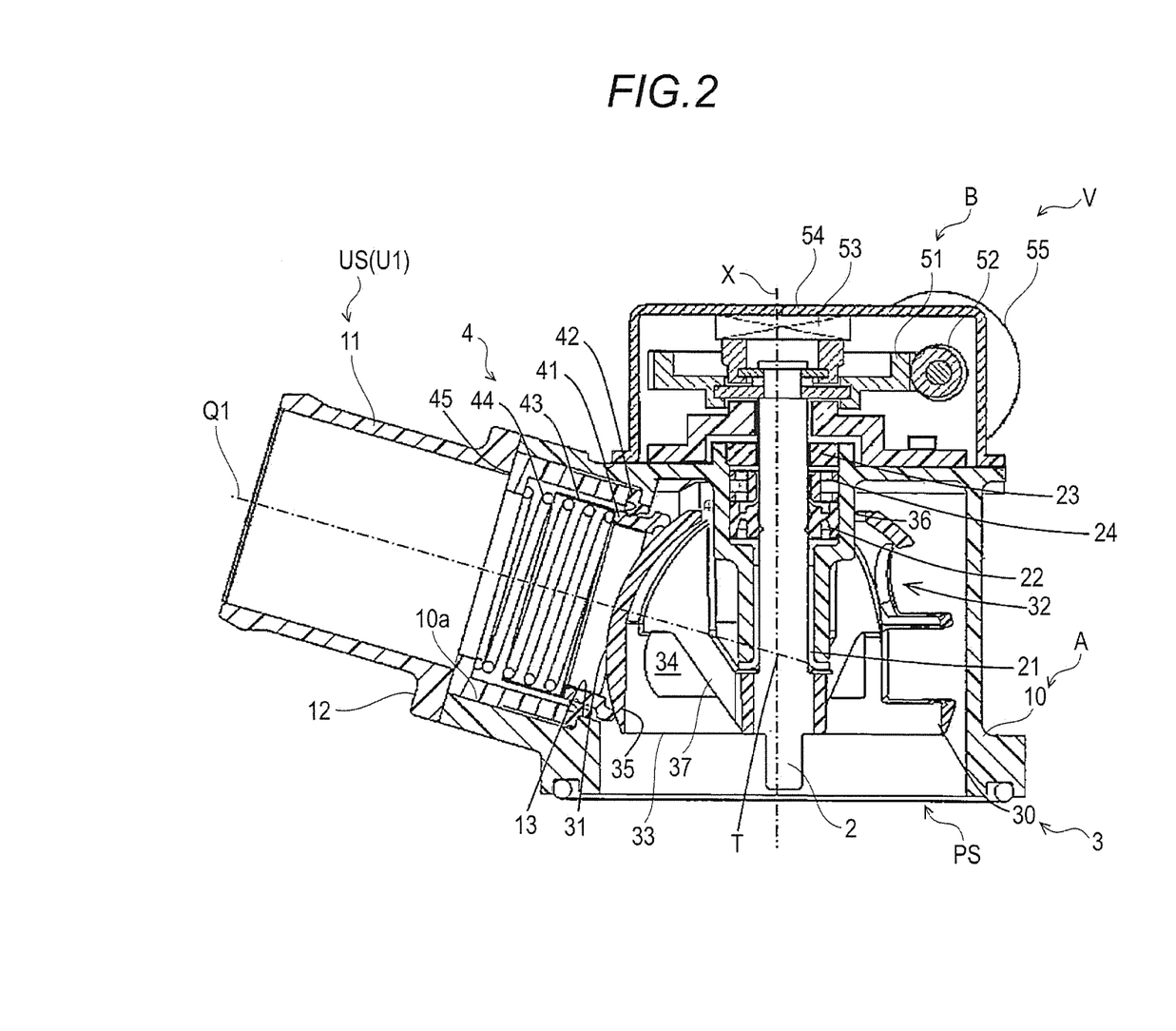
FIG. 2 is a cross-sectional view illustrating a refrigerant control valve device in FIG. 1.

As illustrated in FIG. 2, the refrigerant control valve device V includes a resin-made housing A, a resin-made rotor 3 that is accommodated in the housing A to be rotatable about a rotation axis X and has a spherical outer surface 31 (outer wall surface), and a controller B that rotates the rotor 3 through a rotating shaft 2 (e.g., a shaft). In addition, a first seal 22 and a second seal 23, into which the shaft 2 is inserted to be rotatable around the rotation axis X of the shaft 2, are disposed to seal a portion between the rotor 3 and the controller B. A spacer 24 is provided between the first seal 22 and the second seal 23 in order to secure a space between the spacer 24 and each of the seals. In this case, a housing body 10 is formed with a communication path (not illustrated) that communicates with a drain hole (not illustrated) that allows the space in which the spacer 24 is provided and the outside (atmosphere) to communicate with each other.

The refrigerant control valve device V is configured to supply the coolant of the engine E to at least one of the radiator R and the heater core H as a device that requires heat, and to make a state in which no coolant is supplied to any of the radiator R and the heater core H. In addition, the rotation axis X is set to be orthogonal to an opening plane of the axial port PS from a center position of the axial port PS.

Housing

The axial port PS is formed at one side in the axial direction of the housing body 10 of the housing A. In addition, the housing A is formed with: a circumferential port US (e.g., a first circumferential port U1) having a cylindrical sleeve unit 11 (e.g., a first sleeve unit) protruding outward; and a second circumferential port U2 (illustrated in FIG. 1 but not illustrated in FIG. 2) having a second sleeve unit (not illustrated) protruding outward. Here, an inner diameter of the first sleeve unit 11 is larger than an inner diameter of the second sleeve unit. In addition, it is assumed that the first circumferential port U1 and the second circumferential port U2 are members made of the same material, and have the same function.

There are provided plural circumferential ports US as described above, and a configuration of the first circumferential port U1 will be described as a representative. The first circumferential port U1 includes a cylindrical first sleeve unit 11 to which the radiator hose 1 is connected, a first flange unit 12 formed in a flange shape on the outer circumference of the first sleeve unit 11, and a seal mechanism 4 (e.g., a first seal mechanism) which is accommodated in an inner diameter portion 10a of the housing body 10.

The first flange unit 12 is connected with the housing body 10 over the entire outer circumference thereof by welding. Here, an example in which the first flange unit 12 is connected with the housing body 10 by welding is described by way of an example. However, the first flange unit 12 may be connected with the housing body 10 by being fastened thereto by bolts (not illustrated) or the like. In addition, the first seal mechanism 4 includes an annular first seal member 41, a first packing body 42, a first holder 43, a first biasing member 44, and a first fixing member 45. These components are provided in a state of being inserted into the inner diameter portion 10a of the housing body 10 which extends in a direction of the first sleeve unit 11.

Rotor

As illustrated in FIG. 2, the rotor 3 includes a rotor main body 30 that rotates integrally with the shaft 2 that rotates about the rotation axis X. At this time, the shaft 2 is retained by a bearing unit 21 formed in the housing body 10. In addition, the bearing unit 21 is formed to extend to a position (the axial port PS side illustrated in FIG. 2) below a wall center T where a first centerline Q1 of the first sleeve unit 11 and the rotation axis X intersect.

The rotor main body 30 includes an opening 33 as a receiving portion that receives the coolant from the axial port PS opened in the direction along the rotation axis X, an inner wall 35 of the rotor 3 which is connected to the opening 33 and forms an internal space 34 therein, an outer wall surface 31 which is formed in a spherical shape around the wall center T, and a control hole 32 (a specific example of a hole) which is formed in the outer wall surface 31 so as to send the coolant from the internal space 34 of the rotor 3 to the first circumferential port U1 or the second circumferential port U2.

In the rotor main body 30, an opened portion 36 is formed at a side opposite to the opening 33 in a state in which the shaft 2 penetrates the opened portion 36. Plural connecting bodies 37, which are formed at a protruding end of the shaft 2, are connected to the inner wall 35 of the rotor 3 of the rotor main body 30, so that the plural connecting bodies 37 are rotated integrally with the rotor 3.

As the rotor 3 is rotated by the shaft 2, an opened state and a completely closed state are implemented. In more detail, the opened state refers to a state in which as the rotor 3 is rotated, the coolant flows to at least a part of the control hole 32, and the internal space 34 and the circumferential port PS communicate with each other. In addition, the completely closed state refers to a state in which, as the rotor 3 is rotated, the outer wall surface 31 of the rotor 3 blocks the internal space 34 and the circumferential port US, and thus the coolant does not flow therethrough.

Figure 3:
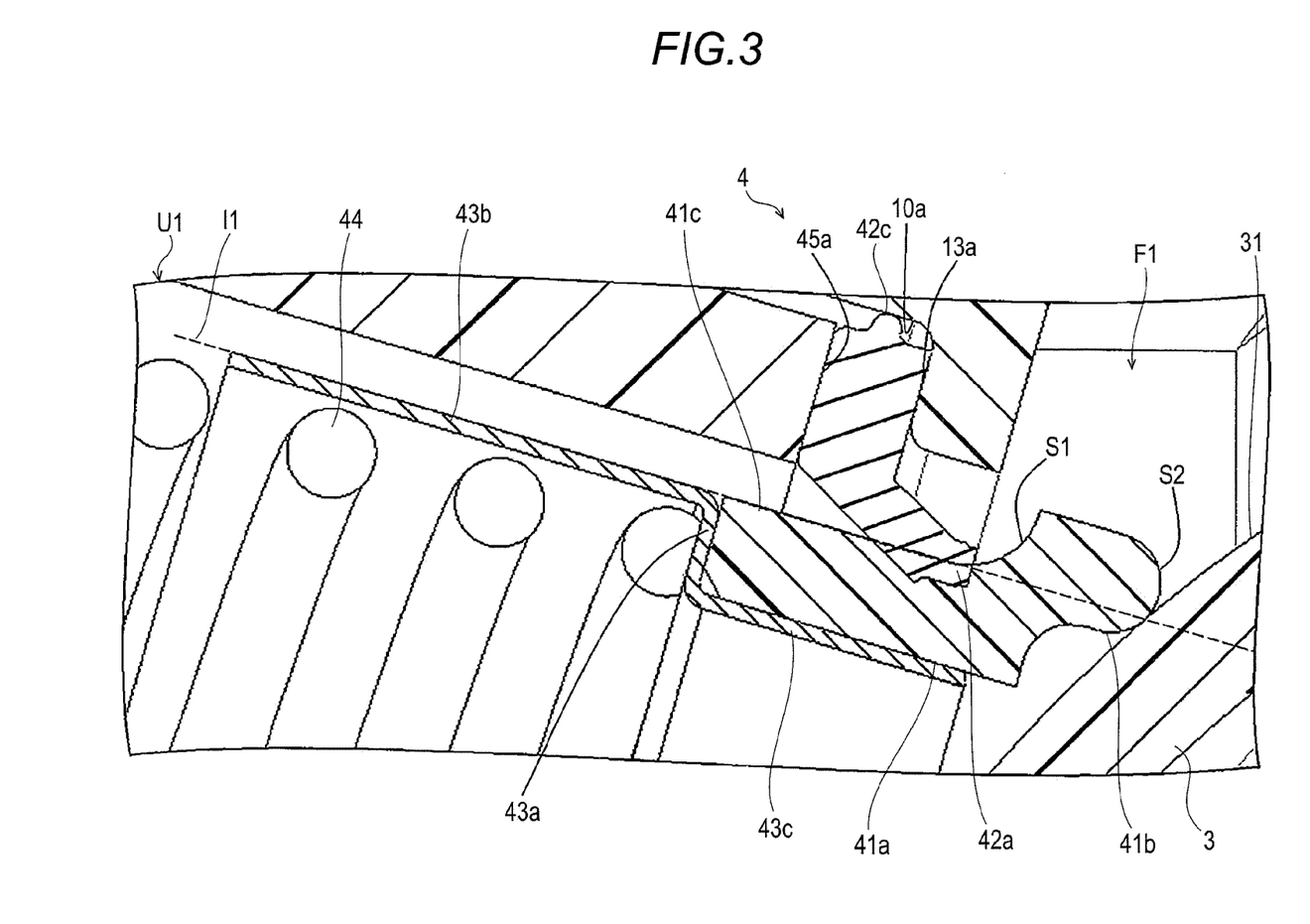
FIG. 3 is an enlarged view illustrating a main portion in a seal mechanism in FIG. 2.

In either case of the opened state and the completely closed state of the rotor 3, the interior of the housing body 10 is filled with the coolant. In more detail, even in the opened state, the opening area of the opening 33 of the rotor 3 at the axial port PS side is necessarily greater than an opening area formed by the control hole 32 and the first seal mechanism 4, and as a result, the interior of the housing body 10 is always filled with the coolant. In addition, in the case in which the rotor is completed closed, the coolant does not flow to the circumferential port US, and thus the interior of the housing body 10 is always filled with the coolant. In addition, as illustrated in FIG. 3, the coolant (F1 portion illustrated in FIG. 3) in the housing body 10 may leak to the circumferential port US from the outer diameter of the first seal member 41 installed in the first seal mechanism 4, but the leak of the coolant is inhibited by installing a packing body 42 to be described below.

Seal Mechanism

The first seal mechanism 4 serves to cut off a flow of the coolant between the first circumferential port U1 and the outer wall surface 31 of the rotor 3 since the entire circumference of the first seal mechanism 4 comes into close contact with the spherical outer wall surface 31 when the rotor 3 is set to a posture that closes the first circumferential port U1.

The first seal member 41 is formed in an annular shape and made of a flexible resin such as polytetrafluoroethylene (PTFE). The first seal member 41 is movable along the first centerline Q1 of the first sleeve unit 11. In addition, as illustrated in FIG. 3, the first seal member 41 includes an inner diameter portion 41a into which the first holder 43 is inserted, a curved portion 41b which is abutted on the outer wall surface 31 of the rotor 3, and an outer diameter portion 41c which is slidably abutted on the first packing body 42.

At the first seal member 41 side which is filled with the refrigerant (F1 side illustrated in FIG. 3) when the first circumferential port U1 and the axial port PS do not communicate with each other, the first seal member 41 forms a first pressure receiving surface S1 that receives pressure applied by the refrigerant in a direction identical to the biasing direction of the first biasing member 44, and a second pressure receiving surface S2 that receives pressure applied by the refrigerant in a direction opposite to the biasing direction of the first biasing member 44. The first pressure receiving surface S1 and the second pressure receiving surface S2 are formed as the first packing body 42 to be described below is disposed to have substantially the same area when viewed in the biasing direction of the first biasing member 44. Specifically, when the first seal member 41 is abutted on the rotor 3 on an extension line of a virtual cylindrical surface I1 of the first holder 43 to be described below, the first packing body 42 is disposed to be abutted on the outer diameter potion 41c of the first seal member 41 which is formed on the virtual cylindrical surface I1 of the first holder 43.

As illustrated in FIG. 3, the first packing body 42 is formed in an annular shape and made of flexible resin, and has an insertion portion 42c formed to be assembled to the housing body 10. The insertion portion 42c is provided in a state of being inserted into the inner diameter portion 12 of the housing body 10. In addition, a convex portion 42a on which the outer diameter portion 41c of the first seal member 41 is slidably abutted is provided on an inner diameter portion of the first packing body 42. As illustrated in FIG. 3, the convex portion 42a is formed to extend toward the rotor 3 side. At this time, the first seal member 41 is configured to be movable along the first centerline 01, but the first packing body 42 is retained not to be moved by being held by an abutment surface 45a of the first fixing member 45 and an abutment surface 13a of the housing body 10. In addition, as the convex portion 42a is formed to extend toward the rotor 3 side, the convex portion 42a acts to be pressed against the outer diameter portion 41c of the first seal member 41 even though the axial port PS side is a high pressure, thereby inhibiting the coolant from leaking from a gap between the first packing body 42 and the first seal member 41.

The first holder 43 is made of a highly rigid metal or resin, and inserted into the inside of the first seal member 41. Further, the first holder 43 is formed to accommodate the first biasing member 44. Here, the first holder 43 is a cylindrical member formed around the first centerline Q1, and has a small diameter portion 43c which has a smaller diameter at a side of the first seal member 41 than at a side of the first biasing member 44, a large diameter portion 43b which has a larger diameter at the side of the first biasing member 44 than at the side of the first seal member 41, and a stepped portion 43a which connects the small diameter portion 43c and the large diameter portion 43b. The stepped portion 43a is formed such that one side of the stepped portion 43a is abutted on the first biasing member 44 so that the biasing force is applied thereto, and the other side of the stepped portion 43a is abutted on an end portion of the first seal member 41. In addition, as illustrated in FIG. 3, the virtual cylindrical surface I1, which extends in a direction along the first centerline Q1 of the outer diameter of the large diameter portion 43b of the first holder 43, is set to be abutted on the first seal member 41 and the outer wall surface 31 of the rotor 3. Therefore, in a direction in which the first centerline Q1 extends, the first pressure receiving surface S1, which receives a hydraulic pressure in the biasing direction of the first biasing member 44, has the same area as the second pressure receiving surface S2 which receives a hydraulic pressure in a direction opposite to the biasing direction of the first biasing member 44. Thus, the hydraulic pressure applied to the first seal member 41 may stably maintain a pressure balance in the first refrigerant control valve device V such that the first seal member 41 and the outer wall surface 31 of the rotor 3 may be stably abutted on each other. Therefore, the sealing property may be stably maintained over a long period of time. In addition, a position where the first seal member 41 and the outer wall surface 31 of the rotor 3 are abutted on each other does not have to be exactly coincident with the virtual cylindrical surface I1, and some errors may be included because the abutment is to cancel out the pressure applied from the coolant.

A first spring 44, which is the first biasing member, is made of a metallic material, and disposed at a position where one end of the first spring 44 is abutted on the first holder 43, and the other end of the first spring 44 is abutted on the first fixing member 45. With the biasing force of the first spring 44, the first seal member 41 is in contact with the outer wall surface 31 of the rotor 3. In addition, the first spring 44 does not protrude toward the first circumferential port U1 by the first fixing member 45.

In particular, the first centerline 01, which is the center of the first sleeve unit 11, is inclined with respect to the rotation axis X. The first centerline Q1 intersects the rotation axis X, the position where the first centerline Q1 intersects the rotation axis X is the wall center T, and the wall center T is coincident with the center of the spherical outer wall surface 31 of the rotor 3. The direction in which the first centerline Q1 is inclined is set such that an outer end side of the first sleeve unit 11 is spaced apart from the rotation axis X and spaced apart from the axial port PS to the extent of a downstream side in a direction in which the coolant flows in the first sleeve unit 11.

The second circumferential port U2 is also formed to have the same configuration and the same material as the first circumferential port U1, but the second circumferential port U2 may not be the same as the first circumferential port U1 in terms of size.

Controller

As illustrated in FIG. 2, the controller B includes a wheel gear 51 that is provided at an end portion of the shaft 2, a worm gear 52 that is engaged with the wheel gear 51, a motor 55 that rotates the worm gear 52, a magnet (not illustrated) that rotates integrally with the wheel gear 51, and a non-contact type rotation angle sensor 53 that detects a rotation posture of the rotor 3 by detecting a magnetic field that changes as the magnet rotates.

These components are accommodated in a watertight case 54, and the motor 55 is controlled by a control device (e.g., a non-illustrated driver). The control device sets a target posture of the rotor 3 based on a detection result of a water temperature sensor that measures the temperature of the coolant of the engine E or based on information required for the heater core H, and performs a control based on a detection signal from the rotation angle sensor 53 such that the rotation posture of the rotor 3 becomes the target posture.

Control of Coolant

The controller B implements a control of setting a rotation posture of the rotor 3 to a completely opened posture in which the first circumferential port U1 and the second circumferential port U2 are simultaneously opened, a first opened posture in which only the first circumferential port U1 is opened, a second opened posture in which only the second circumferential port U2 is opened like the first opened posture, and a completely closed posture in which the first circumferential port U1 and the second circumferential port U2 are closed.

That is, in a case in which the rotation posture of the rotor 3 is set to the completely opened posture, the first circumferential port U1 and the second circumferential port U2 communicate with the internal space 34, and the coolant is supplied to the radiator R from the first circumferential port U1, and at the same time, the coolant is supplied to the heater core H from the second circumferential port U2.

In addition, in a case in which the rotation posture of the rotor 3 is set to the first opened posture as the rotor 3 is rotated in one direction based on the completely opened posture, the first circumferential port U1 and the internal space 34 communicate with each other, and as a result, the coolant may be supplied only to the radiator R. Likewise, in a case in which the rotation posture of the rotor 3 is set to the second opened posture as the rotor 3 is rotated in the other direction based on the completely opened posture, the second circumferential port U2 and the internal space 34 communicate with each other, and as a result, the coolant may be supplied only to the heater core H.

In addition, in a case in which the rotation posture of the rotor 3 is set to the completely closed posture, both of the first circumferential port U1 and the second circumferential port U2 are in a non-communicating state with the internal space 34, and as a result, the coolant is not supplied to the radiator R and the heater core H. The completely closed posture is set in a case in which early warm air is required, for example, immediately after the engine E starts. In addition, in the completely closed posture, the first seal member 41 is in close contact with the outer wall surface 31 of the rotor 3, and a second seal member (not illustrated) is also in close contact with the outer wall surface 31 of the rotor 3.

In addition, the controller B is configured to perform a control to arbitrarily set a supply amount of the coolant to a state in which both of the first circumferential port U1 and the second circumferential port U2 restrict the flow of the coolant (a state in which both of the first circumferential port U1 and the second circumferential port U2 are not completely opened) by setting the rotation posture of the rotor 3.

Second Embodiment

Figure 4:
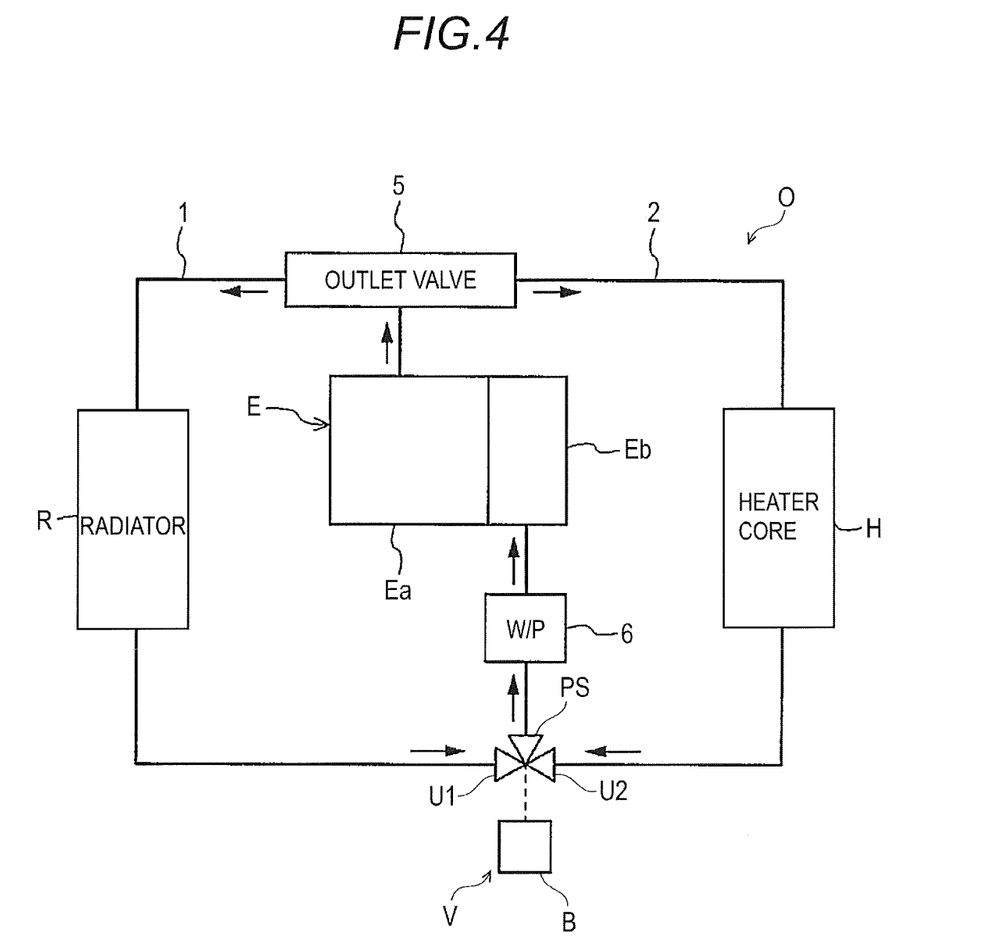
FIG. 4 is an explanatory view illustrating an engine cooling circuit according to a second embodiment.

The second embodiment uses a refrigerant control valve device V having a configuration that is in common with that of the first embodiment, but because the refrigerant control valve device V is used for an engine cooling circuit O illustrated in FIG. 4, the flow direction of the coolant in the refrigerant control valve device V is opposite to that in the first embodiment, and the configuration of the seal mechanism 4 is different from that in the first embodiment. In addition, in the second embodiment, reference numerals in common with those in the first embodiment are assigned.

Second Embodiment: Basic Configuration

As an example in which the refrigerant control valve device V is used, the refrigerant control valve device V is provided in the engine cooling circuit O illustrated in FIG. 4, and includes an axial port PS that returns the coolant to an engine E from the engine E as an internal combustion engine for a vehicle, a first circumferential port U1 that is supplied with the coolant of a radiator R through a radiator hose 1, and a second circumferential port U2 that is supplied with the coolant of a heater core H through a heater hose 2. The engine E has a cylinder head part Ea and a cylinder block part Eb, and the coolant is supplied from the cylinder head part Ea to an outlet valve 5. The outlet valve 5 is configured to be able to split the flow of coolant into a flow directed to the radiator R and a flow directed to the heater core H. In addition, the coolant from the axial port PS is sent to a water pump (W/P) 6, and returns back to the cylinder block part Eb of the engine E from the water pump 6.

In the second embodiment, the refrigerant control valve device V controls the coolant from the radiator R and the heater core H and returns the coolant back to the engine E. However, for example, in a case in which the outlet valve 5 is configured such that the coolant is supplied for heat exchange of engine oil, a fluid of an automatic transmission, or the like, a third inlet port may be formed for the refrigerant control valve device V configured to receive the coolant from a device that performs heat exchange of the engine oil or the fluid.

Because the basic configuration is the same as the first embodiment, descriptions thereof will be omitted, and only the configurations of a different seal mechanism 4 and a housing A including the seal mechanism 4 will be described in detail.

Housing

As in the first embodiment, the axial port PS is formed at one side in the axial direction of a housing body 10 of the housing A. In addition, the housing A is formed with: a circumferential port US (e.g., first circumferential port U1) having a cylindrical sleeve unit 11 (e.g., a first sleeve unit) protruding outward, and a second circumferential port U2 (illustrated in FIG. 4 but not illustrated in FIG. 5) having a second sleeve unit (not illustrated) protruding outward. Here, the inner diameter of the first sleeve unit 11 is larger than the inner diameter of the second sleeve unit. In addition, the first circumferential port U1 and the second circumferential port U2 are members made of the same material, and have the same function.

Figure 5:
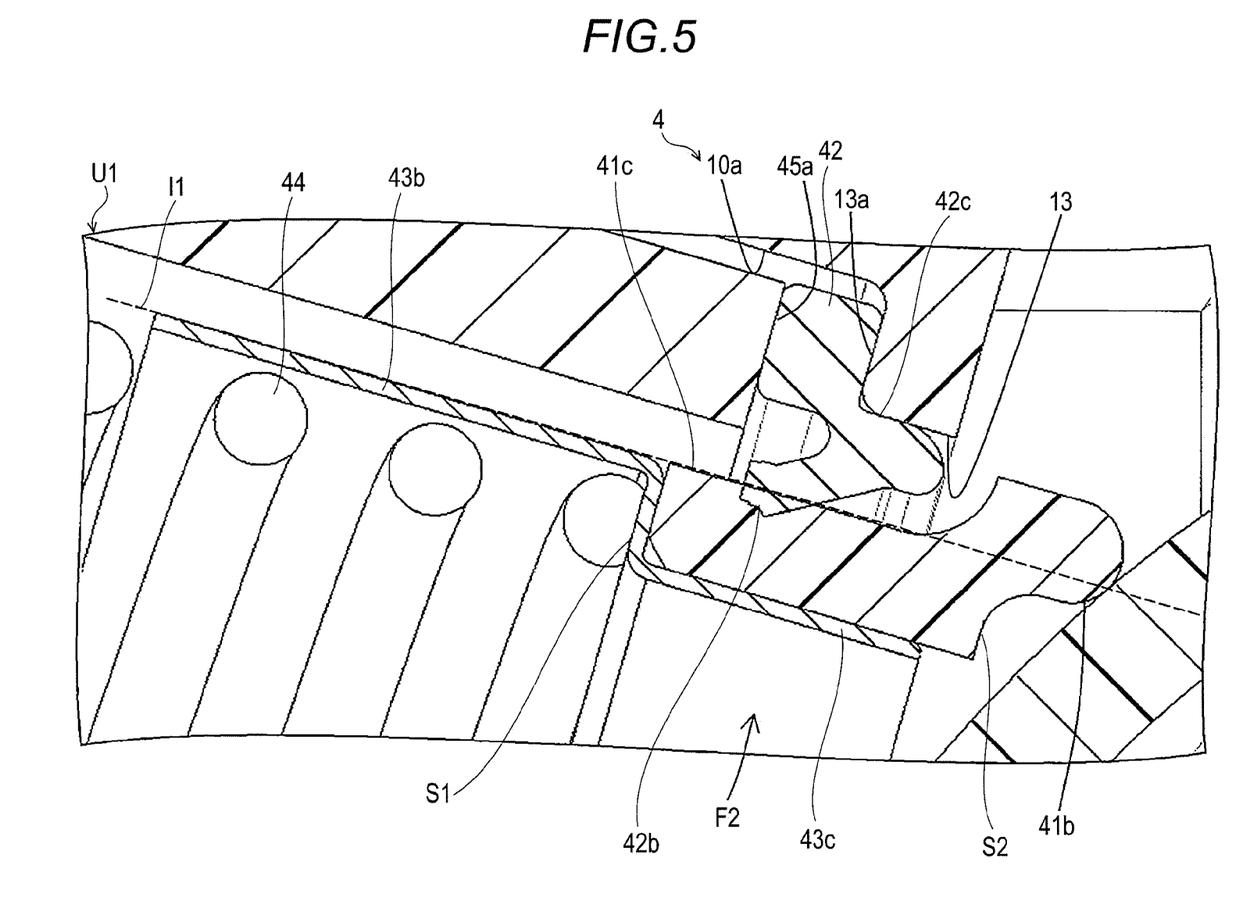
FIG. 5 is an enlarged view illustrating a main portion in a seal mechanism in a second embodiment.

There are provided plural circumferential ports US as described above, and a configuration of the first circumferential port U1 will be described as a representative. The first circumferential port U1 includes a cylindrical first sleeve unit 11 to which the radiator hose 1 is connected, a first flange unit 12 which is formed in a flange shape on the outer circumference of the first sleeve unit 11, and the seal mechanism 4 (e.g., a first seal mechanism) which is accommodated in an inner diameter portion 10a of the housing body 10.

The first flange unit 12 is connected with the housing body 10 over the entire outer circumference thereof by welding. Here, an example in which the first flange unit 12 is connected with the housing body 10 by welding is described by way of an example. However, the first flange unit 12 may connected with the housing body 10 by being fastened thereto by bolts (not illustrated) or the like. In addition, the first seal mechanism 4 includes an annular first seal member 41, a first packing body 42, a first holder 43, a first spring 44, and a first fixing member 45. These components are provided in a state of being inserted into the inside of the inner diameter portion 10a of the housing body 10 which extends in a direction of the first sleeve unit 11.

Rotor

As a rotor 3, a member that is the same as and corresponds to that in the first embodiment is used, and the rotors 3 have the same function as that of the first embodiment.

A difference from the first embodiment is that the circumferential port US (F2 side illustrated in FIG. 5) is always filled with the coolant when the rotor 3 is in the opened posture and in the completely closed posture. cl Seal Mechanism The first seal mechanism 4 serves to cut off a flow of the coolant between the first circumferential port U1 and an outer wall surface 31 of the rotor 3 since the entire circumference of the first seal mechanism 4 comes into close contact with the spherical outer wall surface 31 when the rotor 3 is set to a posture that closes the first circumferential port U1.

Here, because the first seal member 41, the first holder 43, and the first spring 44 have the same configuration and material as those in the first embodiment, descriptions thereof will be omitted. In addition, a hydraulic pressure, which is different from the hydraulic pressure applied to the first seal member 41 in the first embodiment, is applied. Thus, at the first seal member 41 side which is filled with the refrigerant (F2 side illustrated in FIG. 5) when the first circumferential port U1 and the axial port PS do not communicate with each other, the first seal member 41 forms a first pressure receiving surface S1 which receives a pressure applied by the refrigerant in a direction identical to the biasing direction of a first biasing member 44, and a second pressure receiving surface S2 which receives a pressure applied by the refrigerant in a direction opposite to the biasing direction of the first biasing member 44. The first pressure receiving surface S1 and the second pressure receiving surface S2 are formed as the first packing body 42 is disposed to have substantially the same area when viewed in the biasing direction of the first biasing member 44. Specifically, when the first seal member 41 is abutted on the rotor 3 on an extension line of a virtual cylindrical surface I1 of the first holder 43, the first packing body 42 is disposed to be abutted on an outer diameter potion 41c of the first seal member 41 which is formed on the virtual cylindrical surface I1 of the first holder 43. Therefore, a pressure balance in the first refrigerant control valve device V may be stably maintained, and the first seal member 41 may be stably abutted on the outer wall surface 31 of the rotor 3.

The first packing body 42 is formed in an annular shape and made of flexible resin, and has an insertion portion 42c formed to be assembled to the housing body 10. The insertion portion 42c is provided in a state of being inserted into a reduced diameter portion 13 of the housing body 10. In addition, the first packing body 42 includes a convex portion 42b (illustrated in FIG. 5) on which the inner diameter portion of the first packing body 42 and the outer diameter portion 41c (illustrated in FIG. 5) of the first seal member 41 are slidably abutted. As illustrated in FIG. 5, the convex portion 42b is formed to extend toward the entrance side of the first circumferential port U1. At this time, the first seal member 41 is configured to be movable along the first centerline Q1, but the first packing body 42 is retained not to be moved by being held by an abutment surface 45a of the first fixing member 45 and an abutment surface 13a of the housing body 10. In addition, as the convex portion 42a is formed to extend toward the entrance side of the first circumferential port U1, the convex portion 42b acts to be pressed against the outer diameter portion 41c of the first seal member 41 even though the first circumferential port U1 side is at a high pressure, thereby inhibiting the coolant from leaking from a gap between the first packing body 42 and the first seal member 41.

Controller

As a controller B, a member that is the same as and corresponds to the controller B in the first embodiment is used, and the controller B has the same function as that of the first embodiment.

Control of Coolant

Like the first embodiment, the electric controller C implements a control of setting a rotation posture of the rotor 3 to a completely opened posture in which the first circumferential port U1 and the second circumferential port U2 are simultaneously opened, a first opened posture in which only the first circumferential port U1 is opened, a second opened posture in which only the second circumferential port U2 is opened like the first opened posture, and a completely closed posture in which the first circumferential port U1 and the second circumferential port U2 are closed.

That is, in a case in which the rotation posture of the rotor 3 is set to the completely opened posture, the first circumferential port U1 and the second circumferential port U2 communicate with the internal space 34 such that the coolant may return back to the engine E from the radiator R and the heater core H.

In addition, in a case in which the rotation posture of the rotor 3 is set to the first opened posture as the rotor 3 is rotated in one direction based on the completely opened posture, the first circumferential port U1 and the internal space 34 communicate with each other, and as a result, the coolant may return back to the engine E from the radiator R. Likewise, in a case in which the rotation posture of the rotor 3 is set to the second opened posture as the rotor 3 is rotated in the other direction based on the completely opened posture, the second circumferential port U2 and the internal space 34 communicate with each other, and as a result, the coolant may return back to the engine E from the heater core H.

In addition, in a case in which the rotation posture of the rotor 3 is set to the completely closed posture, both of the first circumferential port U1 and the second circumferential port U2 are in a non-communicating state with the internal space 34, and as a result, the coolant does not return back to the engine E from the radiator R and the heater core H. The completely closed posture is set in a case in which early warm air is required, for example, immediately after the engine E starts.

The controller B is configured to perform a control operation of arbitrarily setting a supply amount of the coolant to a state in which both of the first circumferential port U1 and the second circumferential port U2 restrict a flow of the coolant (a state in which both of the first circumferential port U1 and the second circumferential port U2 are not completely opened), by setting the rotation posture of the rotor 3.

Third Embodiment

The third embodiment uses a refrigerant control valve device V having a configuration that is in common with those of the first and second embodiments, but is different from those of the first and second embodiments in that a seal mechanism 4 is configured to be used for the engine cooling circuit O illustrated in FIGS. 1 and 4 regardless of a flow direction of the coolant. In addition, in the third embodiment, reference numerals in common with those in the first and second embodiments are assigned.

Third Embodiment: Basic Configuration

As an example in which the refrigerant control valve device V is used, the refrigerant control valve device V may be applied to both of the engine cooling circuits 0 disclosed in the first and second embodiments. In addition, because the third embodiment has the same use application or the same function as the first and second embodiments, a description thereof will be omitted.

Seal Mechanism

A packing body 42, which is different from those in the first and second embodiments, will be described in detail.

Figure 6:
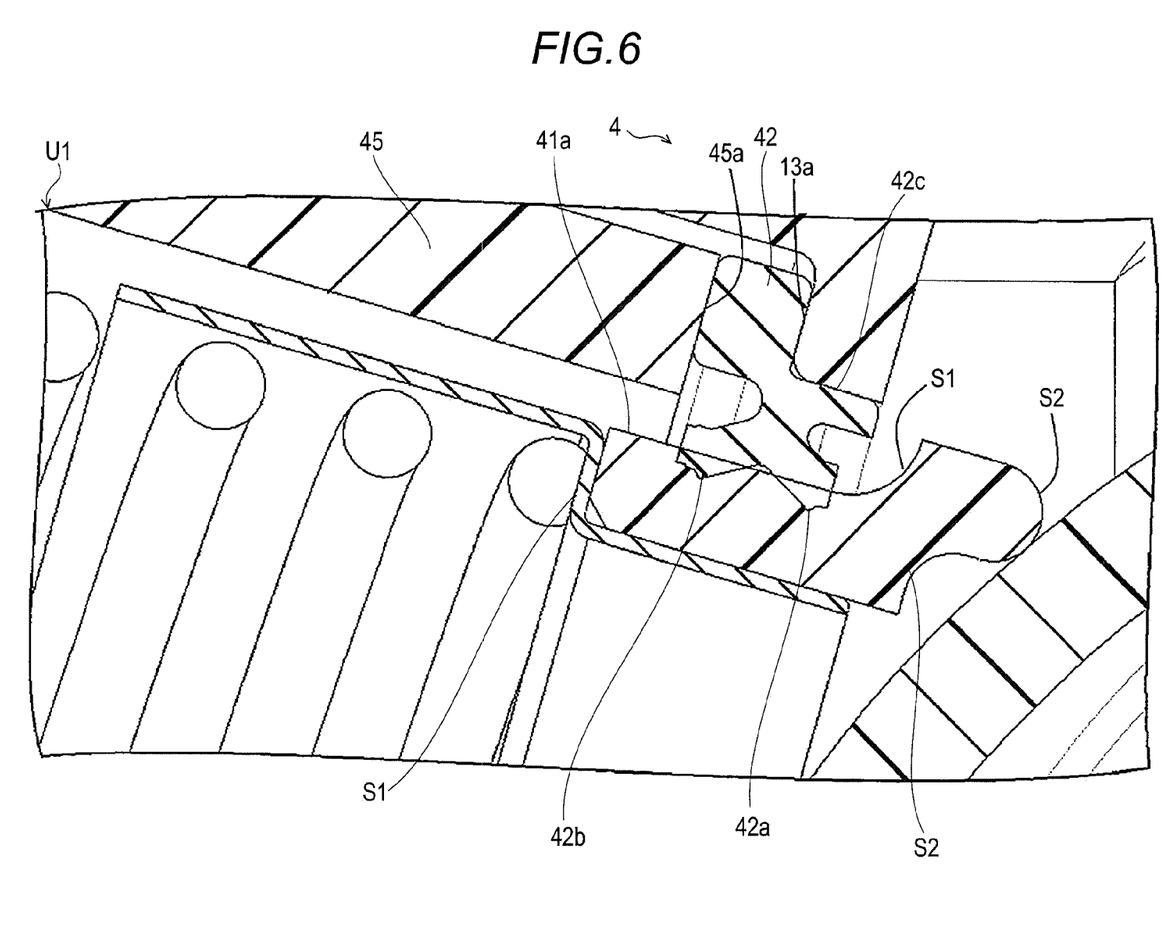
FIG. 6 is an enlarged view illustrating a main portion in a seal mechanism in a third embodiment.

The packing body 42 (e.g., the first packing body illustrated in FIG. 6) is formed in an annular shape and made of a flexible resin, and has an insertion portion 42c formed to be assembled to the housing body 10. The insertion portion 42c is provided in a state of being inserted into a reduced diameter portion 13 of the housing body 10. In addition, as illustrated in FIG. 6, the packing body 42 includes plural convex portions 42a and 42b on which an inner diameter portion of the first packing body 42 and an outer diameter portion 41c of the first seal member 41 are slidably abutted. As illustrated in FIG. 6, the convex portions 42a and 42b are formed to extend toward the rotor 3 side, and toward the entrance side of the first circumferential port U1. At this time, the first seal member 41 is configured to be movable along the first centerline 01, but the first packing body 42 is retained not to be moved by being held by an abutment surface 45a of the first fixing member 45 and an abutment surface 13a of the housing body 10. In addition, as the convex portion 42a is formed to extend toward the rotor 3 side and the convex portion 42b is formed to extend toward the entrance side of the first circumferential port U1, the convex portions 42a and 42b act to be pressed against the outer diameter portion 41c of the first seal member 41 even though both of the axial port PS side and the first circumferential port U1 side are at a high pressure, thereby inhibiting the coolant from leaking from a gap between the first packing body 42 and the first seal member 41.

Control of Coolant

The same use as the above-described first and second embodiments is enabled to have the same function.

The flow rate control valve device disclosed here may be used for various objects to be cooled in various types of vehicles.

A feature of a refrigerant control valve device according to an aspect of this disclosure resides in that the refrigerant control valve device includes: a spherical rotor having an opening opened in a direction of a rotation axis, and configured to rotate about the rotation axis; a housing which includes at least one circumferential port configured to be formed around an axis passing through a spherical center of the rotor, and an axial port formed at a side of the opening in the direction of the rotation axis, in which the housing is configured to allow a refrigerant to flow therein and the rotor is accommodated in the housing; at least one hole formed in the rotor and configured to allow the internal space of the rotor and the circumferential port to communicate with each other when the rotor rotates; a ring-shaped seal member installed coaxially with the circumferential port, and accommodated in the housing to be abutted on an outer surface of the rotor; a biasing member configured to apply a biasing force to the seal member in a direction toward the spherical center of the rotor; a packing body provided between the housing and an outer diameter portion of the seal member, and formed to be slidably abutted on the outer diameter portion of the seal member; and a fixing member configured to hold the packing body with the housing in a direction in which the circumferential port extends. The seal member includes a first pressure receiving surface configured to receive a pressure applied from the refrigerant in a direction identical to a biasing direction of the biasing member, and a second pressure receiving surface having an area that is substantially equal to that of the first pressure receiving surface, and configured to receive a pressure applied by the refrigerant in a direction opposite to the biasing direction with respect to the seal member, at a side of the seal member which is filled with the refrigerant when the rotor is in a state in which the internal space of the rotor and the circumferential port do not communicate with each other.

With this configuration, the pressure of the refrigerant applied in a direction identical to the biasing direction of the biasing member and the pressure of the refrigerant applied in a direction opposite to the biasing direction are cancelled out, at a side of the seal member which is filled with the refrigerant, for example, even when the rotor is operated. Therefore, since only the biasing force of the biasing member may be applied to the seal member, it is possible to improve a sealing property between the seal member and the rotor. In addition, the refrigerant control valve device having the present configuration may be used under various environments. For example, in a case in which the axial port is used as an intake port which becomes an inlet side of a coolant and the circumferential port is used as a discharge port which becomes an outlet side of the coolant, the axial port side is at a higher pressure, and the circumferential port side is at a lower pressure. In addition, there is also a case in which the relationship between the intake port and the discharge port is reversed, so that the axial port side is at a lower pressure and the circumferential port side is at a higher pressure. Even though the use methods are different from each other as described above, the refrigerant does not leak from the high-pressure side to the low-pressure side by disposing the packing body between the outer diameter portion of the seal member and the housing. In addition, because the packing body is disposed to form the first pressure receiving surface and the second pressure receiving surface that define substantially the same area when viewed in a biasing direction of the biasing member at a side of the seal member which is filled with the refrigerant, the sealing property can be stably secured. That is, the sealing property can be improved to correspond to the method of using the refrigerant control valve device having the present configuration (a pressure relationship of the refrigerant, and a flow direction of the refrigerant).

Another feature of the aspect of this disclosure resides in that the housing includes: a cylindrical holder that includes a large diameter portion that accommodates the biasing member, a small diameter portion that has a smaller diameter than the large diameter portion and is inserted into an inner diameter portion of the seal member, and a stepped portion that connects the large diameter portion and the small diameter portion.

With this configuration, the central axis of the biasing member and the central axis of the seal member may be further aligned to be coaxial. Therefore, the assembly precision of the biasing member and the seal member can be improved, and the biasing force of the biasing member can be precisely applied to the seal member. Therefore, the sealing property between the seal member and the rotor can be improved.

Another feature of the aspect of this disclosure resides in that at a side where the packing body is abutted on the seal member, the packing body has a convex portion that extends toward at least one of a circumferential port side and a rotor side. In addition, another feature of the aspect of this disclosure resides in that, when the refrigerant flows from the rotor side to the circumferential port side, the convex portion is formed to extend toward the rotor, and when the refrigerant flows from the circumferential port side to the rotor side, the convex portion is formed to extend toward the circumferential port side.

With these configurations, the convex portion acts to be pressed against the seal member with respect to a flow (pressure) of the refrigerant such that the sealing property between the packing body and the seal member can be further improved.

Another feature of the aspect of this disclosure resides in that a position at which a virtual cylindrical surface obtained by extending an outer circumferential surface of the large diameter portion of the holder in a direction along an axis of the holder intersects an outer surface of the rotor is set to a position at which the seal member and the outer surface of the rotor come into contact with each other. In addition, another feature of the aspect of this disclosure resides in that the packing body is abutted on the seal member on the virtual cylindrical surface of the holder.

With these configurations, a pressure balance applied to the seal member can be further stabilized. Therefore, the sealing property between the seal member and the rotor can be further improved.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A refrigerant control valve device comprising:
   a spherical rotor having an opening opened in a direction of a rotation axis, and configured to rotate about the rotation axis;
   a housing which includes at least one circumferential port configured to be formed around an axis passing through a spherical center of the rotor, and an axial port formed at a side of the opening in the direction of the rotation axis, the housing being configured to allow a refrigerant to flow therein and the rotor being accommodated in the housing;
   at least one hole formed in the rotor and configured to allow the internal space of the rotor and the circumferential port to communicate with each other when the rotor rotates;
   a ring-shaped seal member installed coaxially with the circumferential port, and accommodated in the housing to be abutted on an outer surface of the rotor;
   a biasing member configured to apply a biasing force to the seal member in a direction toward the spherical center of the rotor;
   a packing body provided between the housing and an outer diameter portion of the seal member, and formed to be slidably abutted on the outer diameter portion of the seal member; and
   a fixing member configured to hold the packing body with the housing in a direction in which the circumferential port extends,
   wherein the seal member includes a first pressure receiving surface configured to receive a pressure applied from the refrigerant in a direction identical to a biasing direction of the biasing member, and a second pressure receiving surface having an area that is substantially equal to that of the first pressure receiving surface, and configured to receive a pressure applied by the refrigerant in a direction opposite to the biasing direction with respect to the seal member, at a side of the seal member which is filled with the refrigerant when the rotor is in a state in which the internal space of the rotor and the circumferential port do not communicate with each other.

2. The refrigerant control valve device according to claim 1, wherein the housing includes:
   a cylindrical holder that includes a large diameter portion that accommodates the biasing member, a small diameter portion that has a smaller diameter than the large diameter portion and is inserted into an inner diameter portion of the seal member, and a stepped portion that connects the large diameter portion and the small diameter portion.

3. The refrigerant control valve device according to claim 1, wherein, at a side where the packing body is abutted on the seal member, the packing body has a convex portion that extends toward at least one of a circumferential port side and a rotor side.

4. The refrigerant control valve device according to claim 2, wherein, at a side where the packing body is abutted on the seal member, the packing body has a convex portion that extends toward at least one of a circumferential port side and a rotor side.

5. The refrigerant control valve device according to claim 4, wherein, when the refrigerant flows from the rotor side to the circumferential port side, the convex portion is formed to extend toward the rotor, and when the refrigerant flows from the circumferential port side to the rotor side, the convex portion is formed to extend toward the circumferential port side.

6. The refrigerant control valve device according to claim 2, wherein a position at which a virtual cylindrical surface obtained by extending an outer circumferential surface of the large diameter portion of the holder in a direction along an axis of the holder intersects an outer surface of the rotor is set to a position at which the seal member and the outer surface of the rotor come into contact with each other.

7. The refrigerant control valve device according to claim 3, wherein a position at which a virtual cylindrical surface obtained by extending an outer circumferential surface of the large diameter portion of the holder in a direction along an axis of the holder intersects an outer surface of the rotor is set to a position at which the seal member and the outer surface of the rotor come into contact with each other.

8. The refrigerant control valve device according to claim 4, wherein a position at which a virtual cylindrical surface obtained by extending an outer circumferential surface of the large diameter portion of the holder in a direction along an axis of the holder intersects an outer surface of the rotor is set to a position at which the seal member and the outer surface of the rotor come into contact with each other.

9. The refrigerant control valve device according to claim 5, wherein a position at which a virtual cylindrical surface obtained by extending an outer circumferential surface of the large diameter portion of the holder in a direction along an axis of the holder intersects an outer surface of the rotor is set to a position at which the seal member and the outer surface of the rotor come into contact with each other.

10. The refrigerant control valve device according to claim 6, wherein the packing body is abutted on the seal member on the virtual cylindrical surface of the holder.

11. The refrigerant control valve device according to claim 7, wherein the packing body is abutted on the seal member on the virtual cylindrical surface of the holder.

12. The refrigerant control valve device according to claim 8, wherein the packing body is abutted on the seal member on the virtual cylindrical surface of the holder.

13. The refrigerant control valve device according to claim 9, wherein the packing body is abutted on the seal member on the virtual cylindrical surface of the holder.

* * * * *